(12) United States Patent
Tan (10) Patent No.: US 9,876,294 B2
(45) Date of Patent: Jan. 23, 2018

(54) ELECTRONIC CARD CONNECTOR

(71) Applicant: Molex, LLC, Lisle, IL (US)

(72) Inventor: Han Guan Tan, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/340,774

(22) Filed: Nov. 1, 2016

(65) Prior Publication Data

US 2017/0162962 A1 Jun. 8, 2017

(30) Foreign Application Priority Data

Dec. 3, 2015 (CN) .................... 2015 2 0996623 U (51) Int. Cl.
*H01R 12/57* (2011.01)
*H01R 12/71* (2011.01)

(52) U.S. Cl.
CPC ........... *H01R 12/712* (2013.01); *H01R 12/57* (2013.01)

(58) Field of Classification Search
CPC .................. H01R 13/2442; H01R 12/7076
USPC ................................. 439/630, 682, 736, 862
See application file for complete search history.

(56) References Cited

U.S. PATENT DOCUMENTS

| | | | | |
|---|---|---|---|---|
| 6,068,514 A * | 5/2000 | Zuin | ..................... | G06K 7/0021 439/630 |
| 6,099,335 A * | 8/2000 | Chang | .................. | G06K 7/0013 439/188 |
| 6,454,607 B2 * | 9/2002 | Bricaud | ............... | G06K 7/0021 439/180 |
| 6,568,960 B2 * | 5/2003 | Bricaud | ............... | G06K 7/0013 439/541.5 |
| 6,616,819 B1 * | 9/2003 | Liamos | .............. | G01N 27/3272 204/403.02 |
| 6,857,906 B2 * | 2/2005 | Bricaud | ............... | H01R 12/714 439/630 |
| 7,261,578 B2 * | 8/2007 | Zhao | .................... | H01R 13/633 439/159 |
| 7,435,117 B2 * | 10/2008 | Ma | ........................ | G06K 7/0021 439/188 |
| 7,780,464 B2 * | 8/2010 | Li | ......................... | G06K 7/0021 439/327 |

(Continued)

FOREIGN PATENT DOCUMENTS

| | | |
|---|---|---|
| CN | 203813099 U | 9/2014 |
| CN | 204011821 U | 12/2014 |

(Continued)

*Primary Examiner* — Neil Abrams
(74) *Attorney, Agent, or Firm* — James A. O'Malley (57) ABSTRACT

An electronic card connector is provided which has an insulative body and a plurality of terminals. The body is provided with a plurality of terminal grooves, each having first and second opposite sides. Each groove penetrates the body from a top surface thereof to a lower surface thereof. The terminals are respectively provided to the grooves. Each terminal has a transverse base portion, first and second elastic arms, and a contact portion. Two ends of the base portion are fixed in the groove at the first side. The base portion is exposed in the groove. A distal end of the second arm is a fixed end portion fixed at the second side. The contact portion protrudes from the top surface of the body. The first arm comprises two reverse bent elastic portions and a connecting portion which connects the bent elastic portions.

7 Claims, 9 Drawing Sheets

(56) References Cited

U.S. PATENT DOCUMENTS

| | | | | |
|---|---|---|---|---|
| 7,824,225 B1* | 11/2010 | Wang | ............... | H01R 13/2442 |
| | | | | 439/630 |
| 7,922,547 B2* | 4/2011 | Wu | ............... | G06K 7/0021 |
| | | | | 439/862 |
| 7,955,135 B2* | 6/2011 | Wang | ............... | H01R 12/57 |
| | | | | 439/630 |
| 8,079,876 B2* | 12/2011 | Wang | ............... | H01R 13/2442 |
| | | | | 439/630 |
| 8,202,125 B2* | 6/2012 | Li | ............... | G06K 7/0021 |
| | | | | 439/630 |
| 8,821,191 B2* | 9/2014 | Soo | ............... | H01R 12/55 |
| | | | | 439/630 |
| 8,864,524 B2* | 10/2014 | Sato | ............... | H01R 12/57 |
| | | | | 439/630 |
| 9,004,959 B2* | 4/2015 | Soo | ............... | H01R 9/091 |
| | | | | 439/885 |
| 9,048,593 B2* | 6/2015 | Soo | ............... | G06K 7/0021 |
| 9,130,292 B1* | 9/2015 | Xie | ............... | H01R 13/405 |
| 9,178,298 B2* | 11/2015 | Li | ............... | H01R 13/2442 |
| 9,178,325 B2* | 11/2015 | Soo | ............... | H01R 12/72 |
| 9,184,519 B2* | 11/2015 | Hou | ............... | H01R 12/714 |
| 9,318,837 B2* | 4/2016 | Tan | ............... | H01R 13/506 |
| 9,444,196 B2* | 9/2016 | Wang | ............... | G06K 19/00 |
| 9,515,400 B2* | 12/2016 | Zeng | ............... | H01R 12/7076 |
| 9,608,384 B2* | 3/2017 | Soo | ............... | H01R 13/70 |
| 9,614,312 B2* | 4/2017 | Wang | ............... | H01R 13/2478 |
| 2017/0162962 A1* | 6/2017 | Tan | ............... | H01R 12/712 |

FOREIGN PATENT DOCUMENTS

| | | |
|---|---|---|
| JP | 3138751 U | 1/2008 |
| TW | M312802 U | 5/2007 |

* cited by examiner

ELECTRONIC CARD CONNECTOR

RELATED APPLICATIONS

This application claims priority to Chinese Application No. 201520996623.9, filed Dec. 3, 2015, which is incorporated herein by reference in its entirety.

TECHNICAL FIELD

The present disclosure relates to an electronic card connector, and more specifically relates to an electronic card connector that uses a double support beam-like contact terminal.

BACKGROUND ART

A terminal of an electrical connector disclosed in Taiwanese utility model patent issued publication No.TWM312802 (corresponding to Chinese patent application No.CN200620049000.1) is fixed in a corresponding groove of an insulative body of an electrical connector by use of insert molding technology known by a person skilled in the art. Two ends of the terminal are fixed in the insulative body and in turn the terminal is formed as a double support beam-like contact member, the advantage of using the double support beam-like contact member is that there is no free end, so a card tray or a card adapter inserted into the electrical connector will not hooked by the terminal and in turn the terminal will not allow the contact member to be plastically deformed or be damaged. However, if the double support beam-like contact member is used, the double support beam-like contact member with such a structure is sufficient in rigidity but is not sufficient in elasticity, the double support beam-like contact member will apply an excessive high contact pressure on an electronic card (such as SIM (Subscriber Identity Module) card), which may damage the electronic card or may shorten the lifespan of the electronic card.

In addition, a first extension portion and a second extension portion of the terminal extend horizontally and then are directly fixed in the insulative body, that is to say, the two ends of the terminal in an extension direction are inserted in a straight line and fixed. Therefore, when the terminal is deformed downwardly between the two fixed ends, materials of the terminal in the extension direction will squeeze each other due to strain of deformation, which easily allows the terminal to be plastically deformed. The two fixed ends of the terminal will be subjected to excessive squeeze which may allow the two fixed ends of the terminal to be loosed from the insulative body or to be damaged.

SUMMARY

In view of the above problem, the present disclosure correspondingly provides a new electronic card connector which uses a double support beam-like contact terminal.

In an embodiment of the present disclosure, an electronic card connector comprises an insulative body and a plurality of terminals. The insulative body is provided with a plurality of terminal grooves, each terminal groove comprises a first side and a second side which are opposite, each terminal groove penetrates the insulative body from a top surface of the insulative body to a lower surface of the insulative body. The plurality of terminals are respectively provided to the plurality of terminal grooves. Each terminal comprises: a transverse base portion positioned at the first side of the terminal groove; a first elastic arm reversely bent from a side of the transverse base portion toward the first side and extending toward the second side; a contact portion extending from a distal end of the first elastic arm toward the second side; and a second elastic arm extending from the contact portion toward the second side. Two ends of the transverse base portion are fixed in the terminal groove at the first side, the transverse base portion is exposed in the terminal groove; a distal end of the second elastic arm is a fixed end portion fixed at the second side; the contact portion protrudes from the top surface of the insulative body; the first elastic arm comprises two reverse bent elastic portions and a connecting portion which connects the two reverse bent elastic portions, the two reverse bent elastic portions are spaced apart from each other and are reversely bent from the side of the transverse base portion toward the first side and extend toward the second side.

In an embodiment of the present disclosure, the second elastic arm comprises an upper arm portion, a lower arm portion and a step portion, the step portion connects the upper arm portion and the lower arm portion.

In an embodiment of the present disclosure, each terminal further comprises a fixed portion connecting the transverse base portion, the fixed portion is embedded in the insulative body.

In an embodiment of the present disclosure, each terminal further comprises a soldering portion connecting the transverse base portion, the soldering portion extends downwardly from a side of the transverse base portion toward the second side.

In an embodiment of the present disclosure, the fixed end portion is formed as a T-shape and is embedded in the insulative body.

In an embodiment of the present disclosure, the first elastic arm and the second elastic arm are not higher than the top surface of the insulative body.

In an embodiment of the present disclosure, the insulative body defines a front end and a rear end, the insulative body is provided with two rows of terminal grooves, the two rows extend along a front-rear direction, all the first sides of all the terminal grooves in the front row face toward the front end of the insulative body and all the openings of all the terminal grooves in the front row are positioned at the front end, all the first sides of all the terminal grooves in the rear row face toward the rear end of the insulative body and all the openings of all the terminal grooves in the rear row is positioned at the rear end.

The two ends of the terminal of the electrical connector disclosed in the utility model patent TWM312802 in the background of the present disclosure are fixed in an insulative body and in turn the terminal is formed as a double support beam-like contact member. However, if the double support beam-like contact member is used, the double support beam-like contact member with such a structure is sufficient in rigidity but is not sufficient in the elasticity, the double support beam-like contact member will apply an excessive high contact pressure on an electronic card, which may damage the electronic card or shorten the lifespan of the electronic card. In addition, the first extension portion and the second extension portion of the terminal of the electrical connector in the background extend horizontally and then are directly fixed in the insulative body, that is to say, the two ends of the terminal in the extension direction are inserted in a straight line and fixed. Therefore, when the terminal is deformed downwardly between the two fixed ends, materials of the terminal in the extension direction will squeeze each other due to strain of deformation, which easily allows the terminal to be plastically deformed, the two fixed ends of the terminal will be subjected to excessive squeeze which may allow the two fixed ends of the terminal to be loosed from the insulative body or to be damaged.

The electronic card connector of the present disclosure also uses the double support beam-like contact member, that the transverse base portion is exposed in the terminal groove and the first elastic arm is reversely bent from the transverse base portion allows the terminal to relax the squeeze among materials of the terminal in the extension direction when the terminal is elastically deformed, and avoids plastic deformation of the terminal due to excessive squeeze. In addition, the configuration that the first elastic arm is reversely bent from the transverse base portion can allow the length of the terminal to be increased so as to reduce the rigidity of the terminal. Moreover, the configuration that the first elastic arm comprises the two reverse bent elastic portions can allow the contact force applied by the contact portion to be increased. Furthermore, the configuration that the second elastic arm is formed with the upper arm portion and the lower arm portion via the step portion can further increase the contact force applied by the contact portion.

Technical features and advantages of the present disclosure are widely summarized as above, so as to better understand the following detailed description. Other technical feature making up technical solutions of the claims of the present disclosure and other advantages will be described below. A person skilled in the art of the present disclosure shall understand that the concept and specific embodiments disclosed below may be easily used to modify or design other configuration or manufacturing approach so as to realize the same object as the present disclosure. A person skilled in the art of the present disclosure shall also understand that, such an equivalent configuration or approach cannot be departed from the spirit and scope of the present disclosure defined by the appended claims.

BRIEF DESCRIPTION OF THE DRAWINGS

The various respects of the present disclosure may be best understood by the following detailed description taken in connection with the accompanying Figures. It should be noted that, according to a standard implementing mode of the industries, features are not drawn as the scale. In practice, for the sake of clear explanation, various features may be arbitrarily enlarged or reduced in dimension.

DETAILED DESCRIPTION OF THE PREFERRED EMBODIMENTS

The following disclose content provides various embodiments or exemplifications used to implement various features of the present disclosure. Specific examples of elements and arrangements are described as follows, so as to simplify the disclosed content of the present disclosure. Certainly, these are merely examples, and are not used to limit the present disclosure. For example, in the following description, that a first feature is formed on or above a second feature may comprise an embodiment that the first feature and the second are formed to directly contact with each other, may also comprise an embodiment that other feature is formed between the first feature and the second feature, therefore the first feature and the second feature do not directly contact with each other. Moreover, the present disclosure may allow a symbol and/or a character of an element to be repeated in different examples. The repetition is used for simplification and clearness, but is not used to dominate a relationship between various embodiments and/or discussed structures.

Moreover, the present disclosure may use spatial corresponding terminologies, such as "below", "lower than", "relative lower", "higher than", "relative high" and the like, so as to describe a relationship between an elements or feature and another element or feature. Spatial corresponding terminologies are used to comprise various orientations of an apparatus in use or operation besides orientations illustrated in Figures. Or the apparatus may be orientated (rotated by 90 degrees or at other orientation), and the corresponding spatial description in the present disclosure may be correspondingly explained. It should be understood that, when a feature is formed to another feature or above a board, other feature may presented between them.

Figure 1:
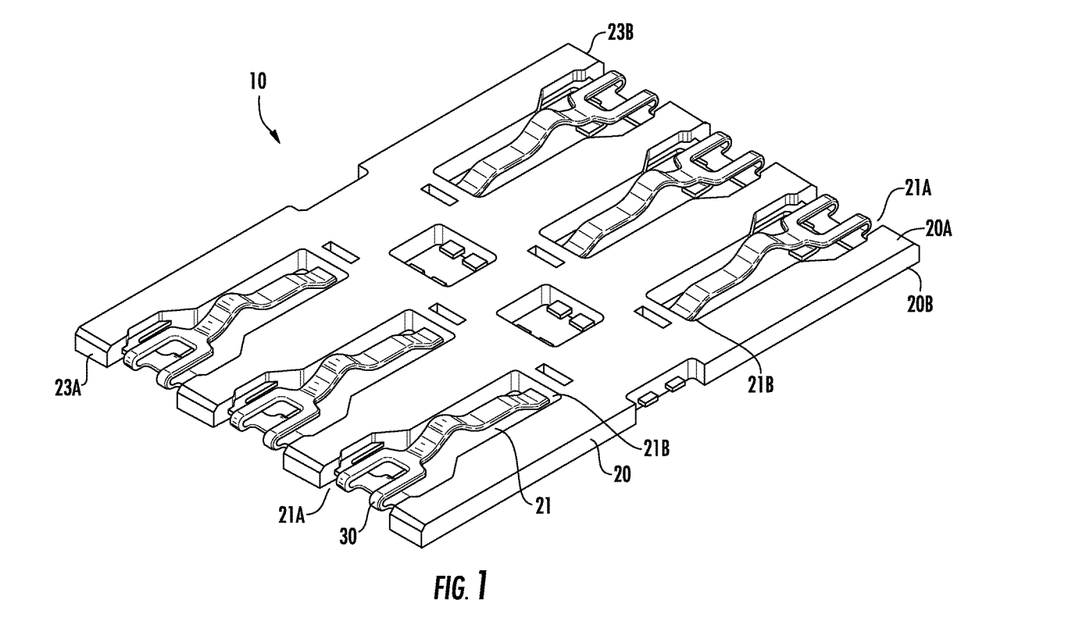
FIG. 1 is a schematic view of an electronic card connector of an embodiment of the present disclosure.
Figure 2:
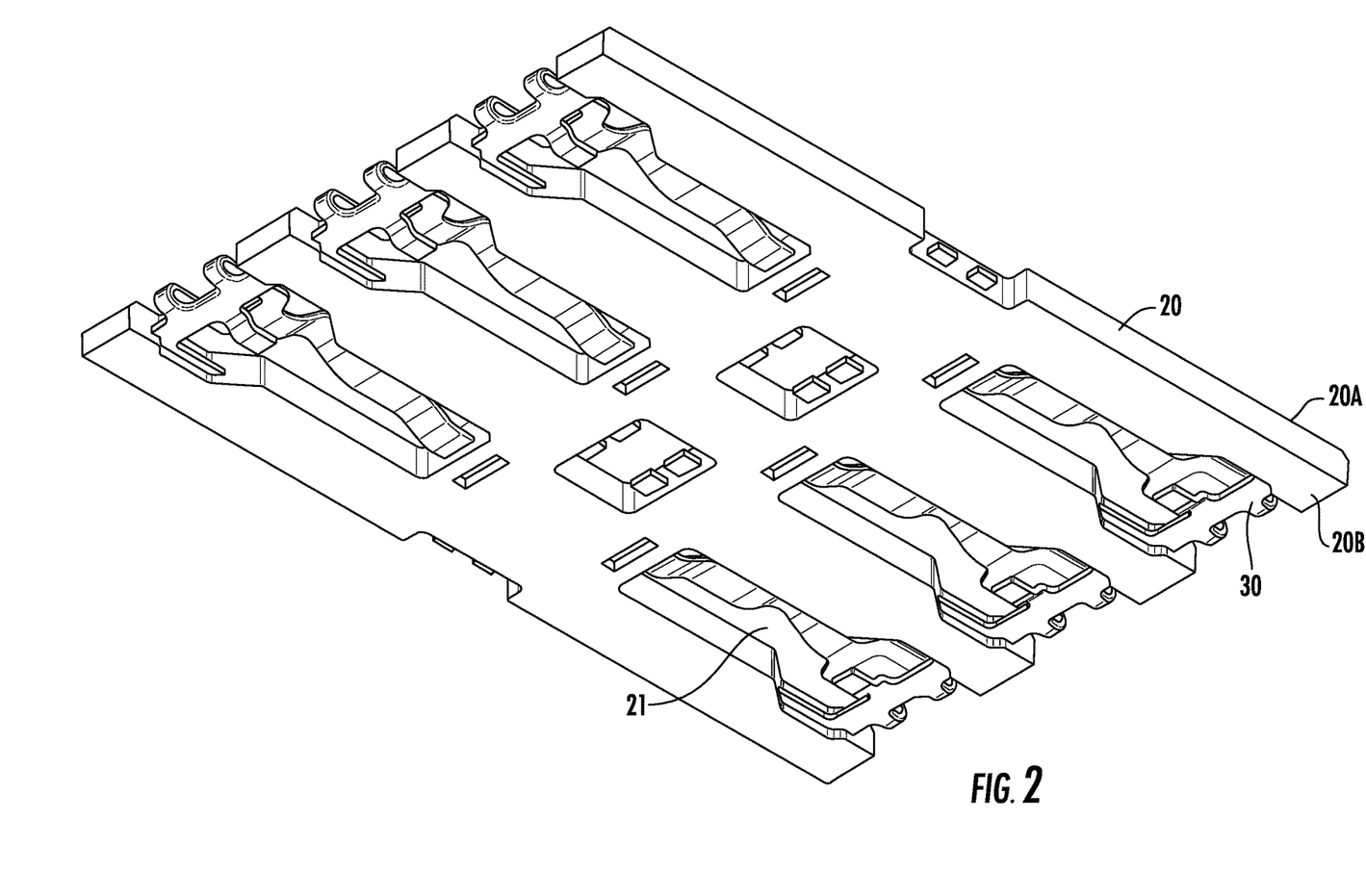
FIG. 2 is a schematic view of the electronic card connector of FIG. 1 viewed from another angle.
Figure 3:
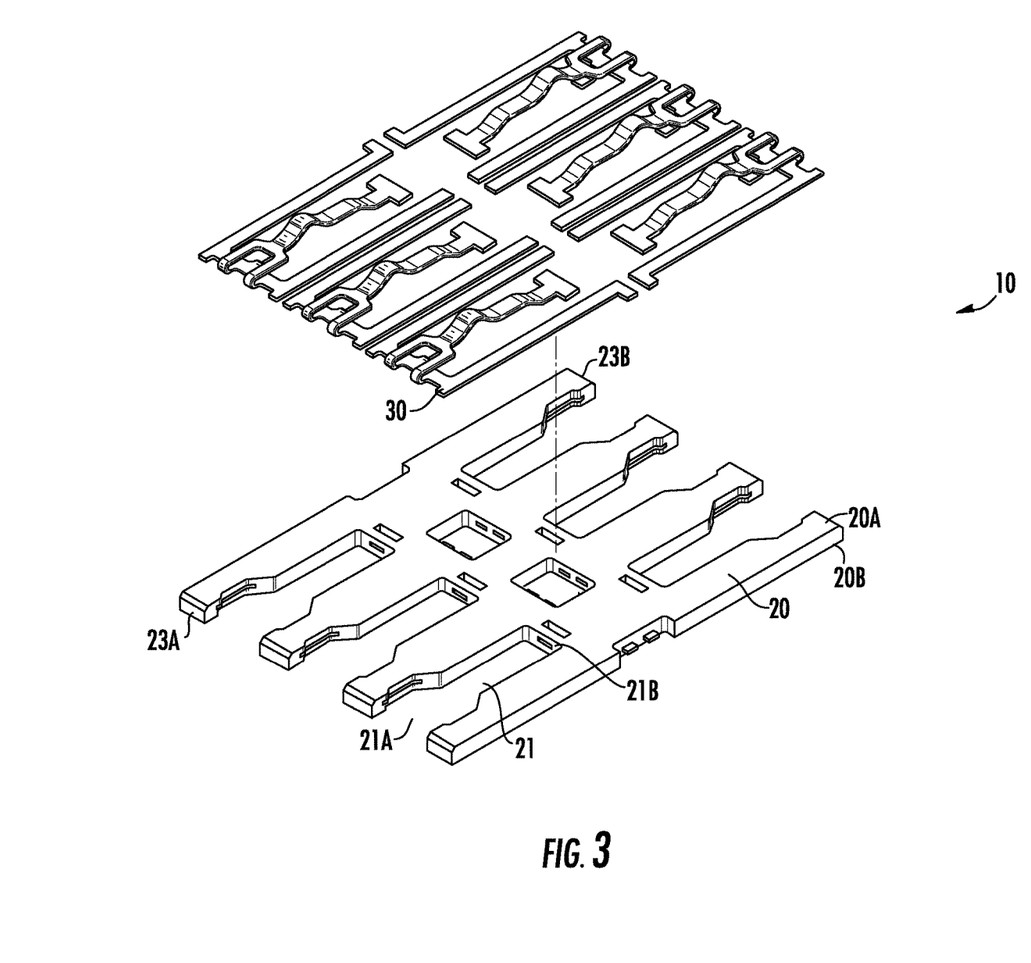
FIG. 3 is an exploded view of the electronic card connector of FIG. 1.

FIG. 1 is a schematic view of an electronic card connector 10 of an embodiment of the present disclosure, FIG. 2 is a schematic view of the electronic card connector 10 of FIG. 1 viewed from another angle, FIG. 3 is an exploded view of the electronic card connector 10 of FIG. 1. An electronic card connector 10 of an embodiment of the present disclosure comprises an insulative body 20 and a plurality of terminals 30. The insulative body 20 is provided with a plurality of terminal grooves 21, each terminal groove 21 comprises a first side 21A and a second side 21B which are opposite, and each terminal groove 21 penetrates the insulative body 20 from a top surface 20A of the insulative body 20 to a lower surface 20B of the insulative body 20. In addition, the plurality of terminals 31 are respectively provided to the plurality of terminal grooves 21. In an embodiment of the present disclosure, the insulative body 20 comprises the six terminal grooves 21, and the six terminals 30 are respectively provided in the six terminal grooves 21.

Referring to FIG. 1, the insulative body 20 defines a front end 23A and a rear end 23B, the insulative body 20 is provided with two rows of terminal grooves 21, the two rows extend along a front-rear direction, the three first sides 21A of the three terminal grooves 21 in the front row face toward the front end 23A of the insulative body 20 and three openings of the three terminal grooves 21 in the front row are positioned at the front end 23A; the three first sides 21A of the three terminal grooves 21 in the rear row face toward the rear end 23B of the insulative body 20 and three openings of the three terminal grooves 21 in the rear row are positioned at the rear end 23B.

Figure 4:
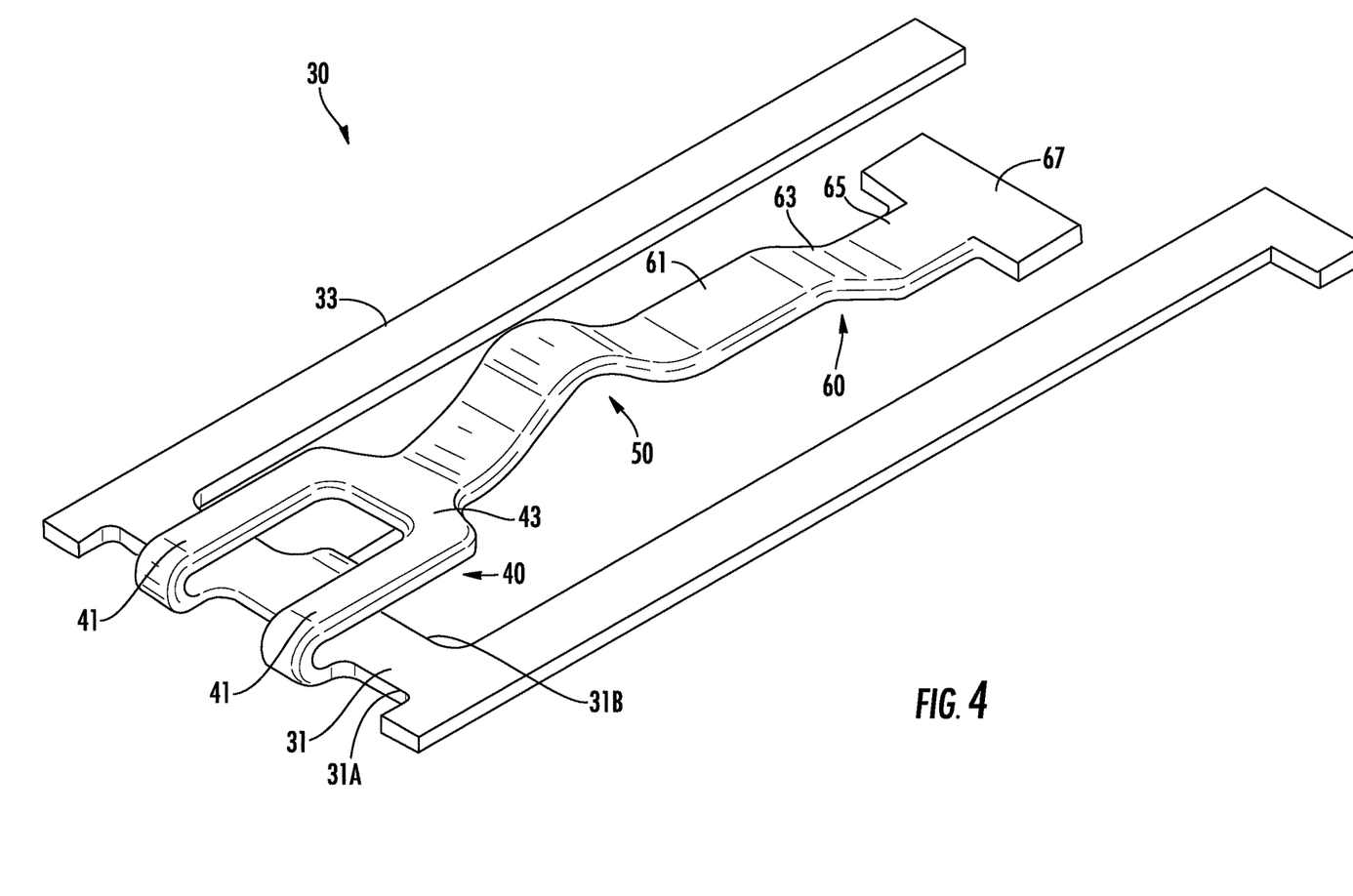
FIG. 4 is a schematic view of a terminal of an embodiment of the present disclosure.
Figure 5:
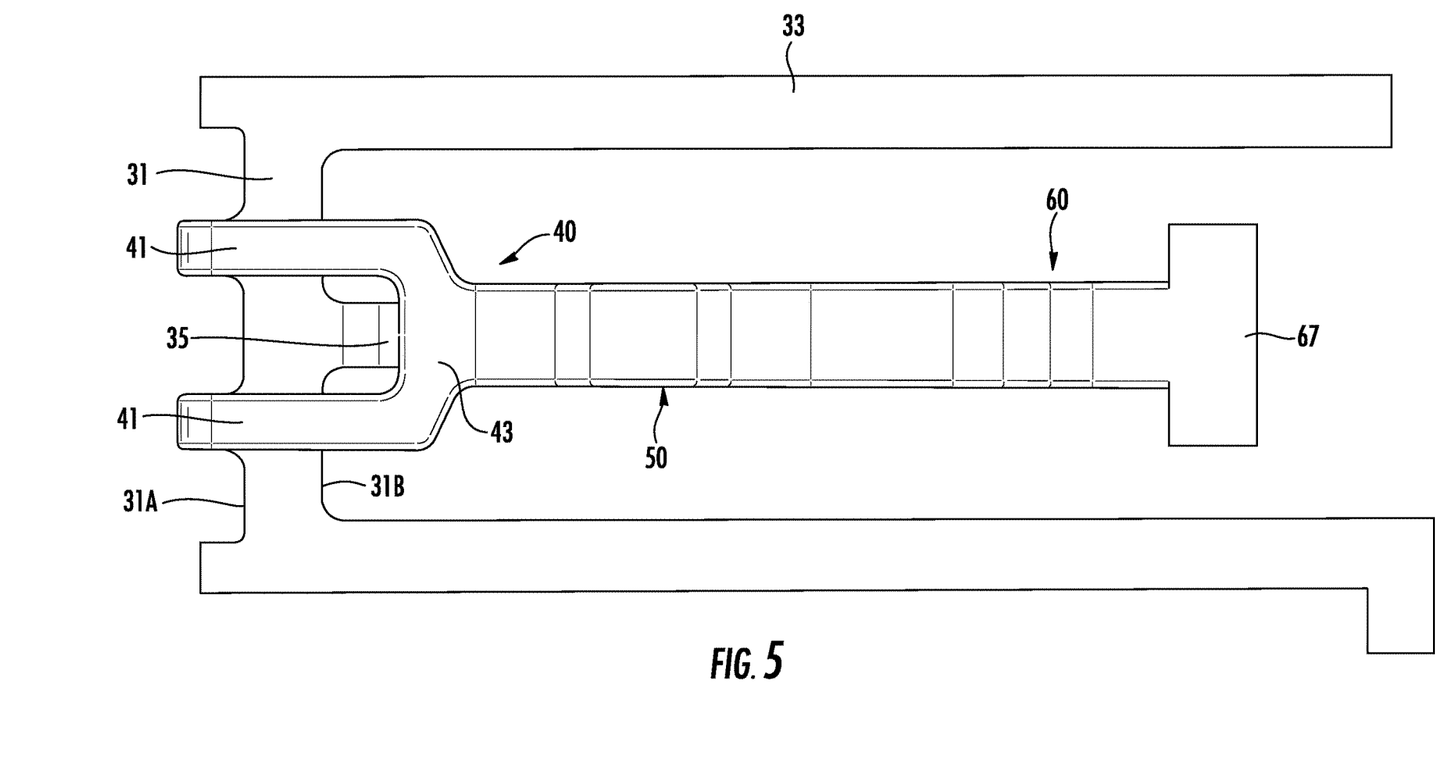
FIG. 5 is a top view of the terminal of FIG. 4.
Figure 6:
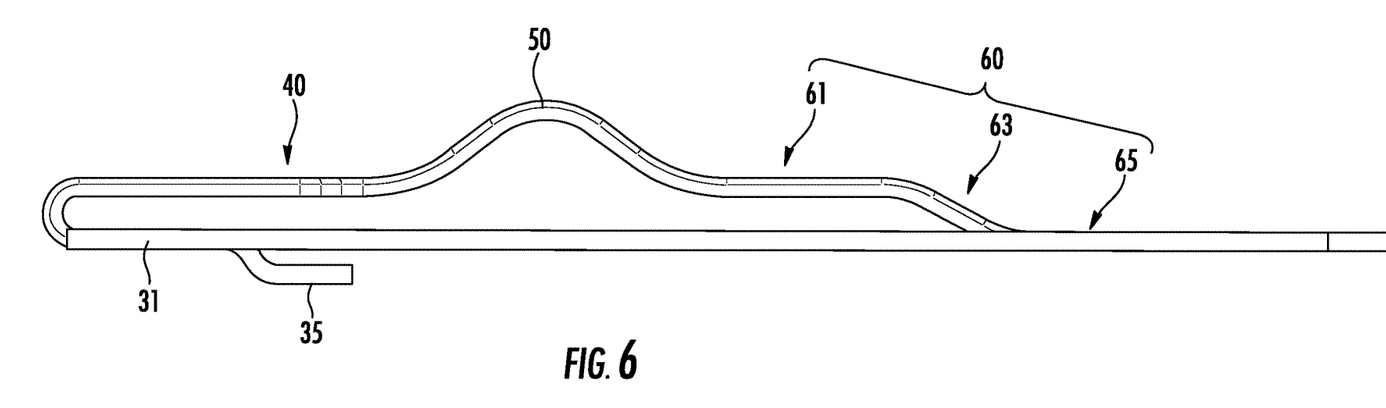
FIG. 6 is a side view of the terminal of FIG. 4.

FIG. 4 is a schematic view of a terminal 30 of an embodiment of the present disclosure, FIG. 5 is a top view of the terminal 30 of FIG. 4, FIG. 6 is a side view of the terminal 30 of FIG. 4. Each terminal 30 comprises a transverse base portion 31, a first elastic arm 40, a contact portion 50 and a second elastic arm 60. The terminal 30 further comprises two fixed portions 33 which are respectively connected to two ends of the transverse base portion 31. Moreover, a fixed end portion 67 of the second elastic arm 60 is formed as a T-shape.

Referring to FIG. 1 and FIG. 4, the transverse base portion 31 is positioned at the first side 21A of the terminal groove 21. The transverse base portion 31 defines an outer side 31A and an inner side 31B, the outer side 31A faces toward the first side 21A of the terminal groove 21, the inner side 31B faces toward the second side 21B of the terminal groove 21. The first elastic arm 40 is reversely bent upwards from the outer side 31A (which faces toward the first side 21A of the terminal groove 21) of the transverse base portion 31 and extends toward the second side 21B of the terminal groove 21. The contact portion 50 extends from a distal end of the first elastic arm 40 toward the second side 21B of the terminal groove 21. The second elastic arm 60 extends from the contact portion 50 toward the second side 21B of the terminal groove 21.

The first elastic arm 40 comprises two reverse bent elastic portions 41 and a connecting portion 43. The two reverse bent elastic portions 41 are spaced apart from each other and are reversely bent upwards from the outer side 31A (which faces toward the first side 21A of the terminal groove 21) of the transverse base portion 31 and extend toward the second side 21B of the terminal groove 21. The connecting portion 43 connects the two reverse bent elastic portions 41. The configuration that the first elastic arm 40 is reversely bent from the transverse base portion 31 can allow a length of the terminal 30 to be increased so as to reduce the rigidity of the terminal 30. Moreover, the configuration that the first elastic arm 40 comprises the two reverse bent elastic portions 41 can allow the contact force applied by the contact portion 50 to be increased.

Referring to FIG. 4, FIG. 5 and FIG. 6, the terminal 30 further comprises a soldering portion 35, the soldering portion 35 is connected to the transverse base portion 31 and extends downwardly from the inner side 31B (which faces toward the second side 21B of the terminal groove 21) of the transverse base portion 31. The second elastic arm 60 comprises an upper arm portion 61, a lower arm portion 65 and a step portion 63, the step portion 63 connects the upper arm portion 61 and the lower arm portion 65, the step portion 63 allows the upper arm portion 61 and the lower arm portion 65 to have a height difference between the upper arm portion 61 and the lower arm portion 65, so as to further increase the contact force applied by the contact portion 50.

Figure 7:
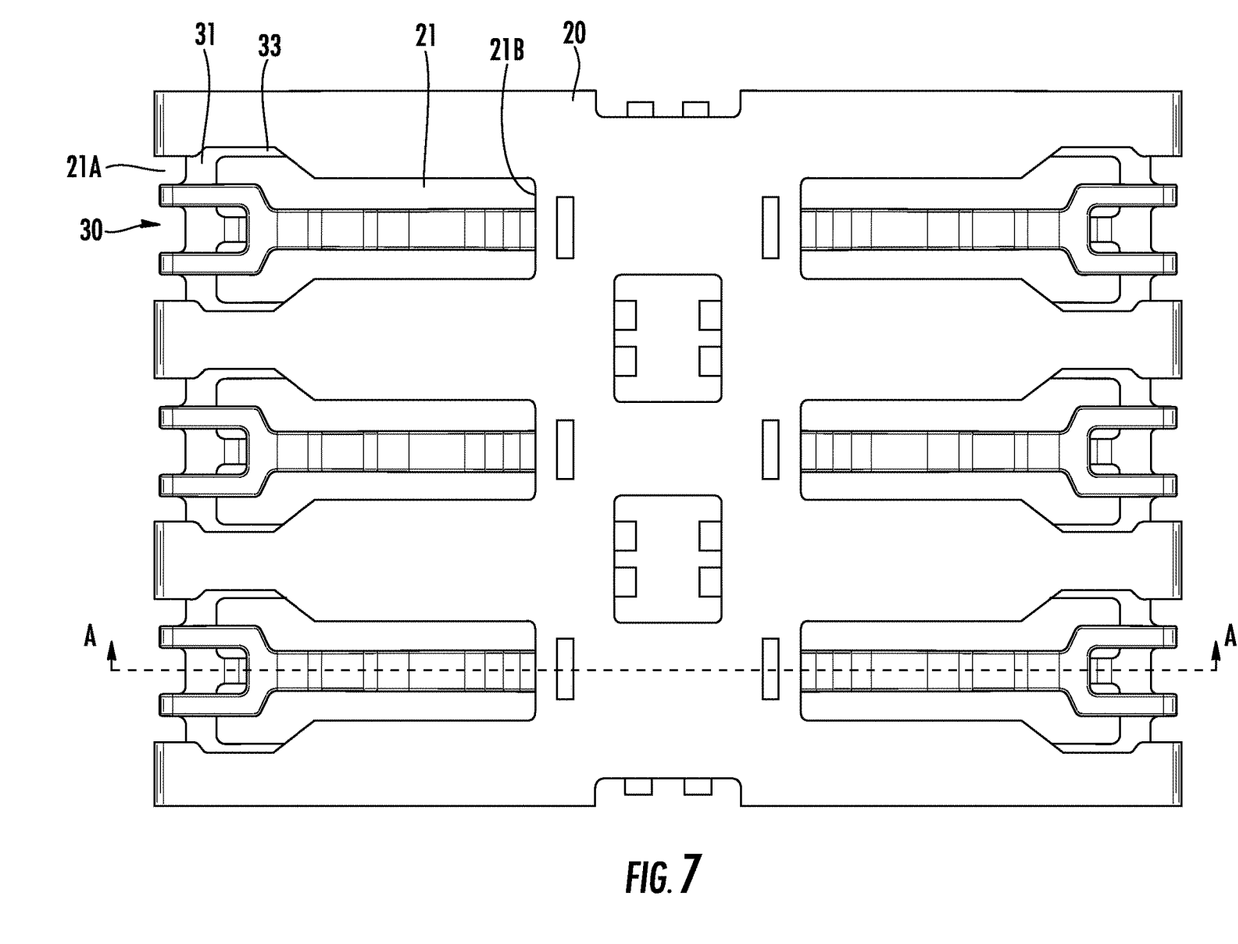
FIG. 7 is a top view of the electronic card connector of FIG. 1.
Figure 8:
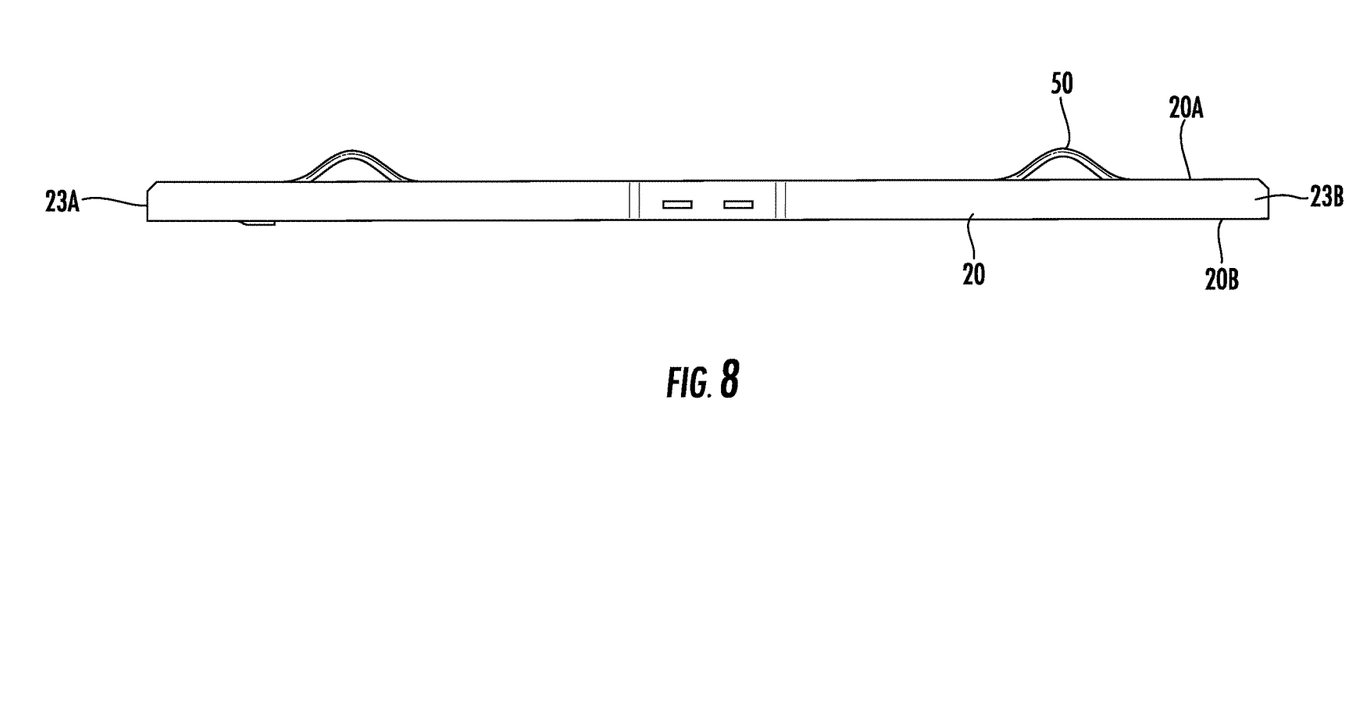
FIG. 8 is a side view of the electronic card connector of FIG. 7.
Figure 9:
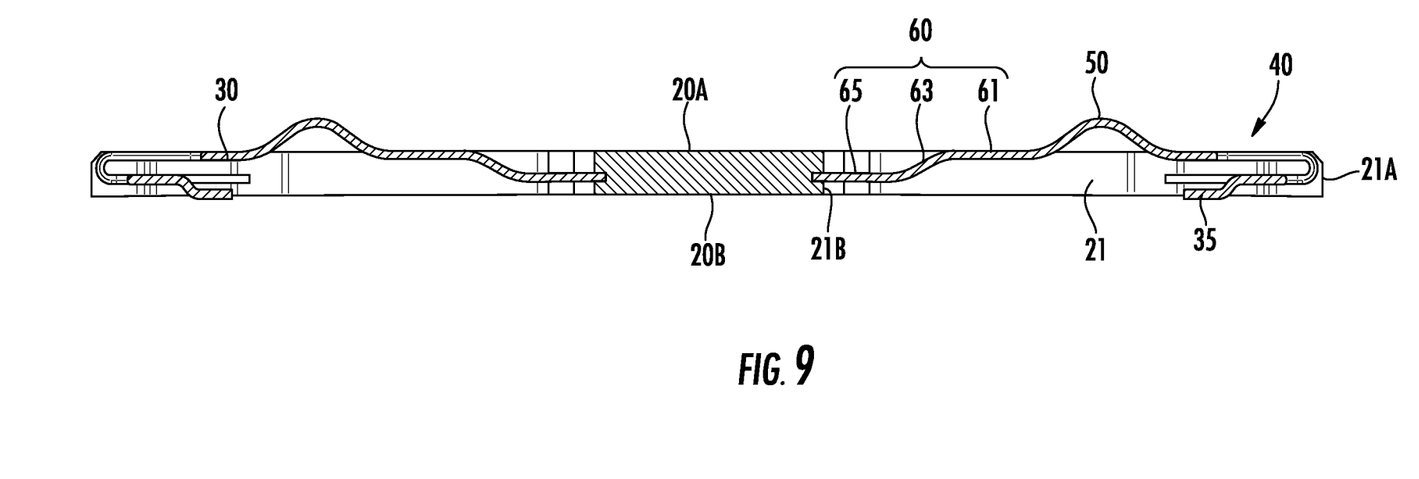
FIG. 9 is a cross sectional view of the electronic card connector taken along a line A-A of FIG. 7.

FIG. 7 is a top view of the electronic card connector 10 of FIG. 1, FIG. 8 is a side view of the electronic card connector 10 of FIG. 7, FIG. 9 is a cross sectional view of the electronic card connector 10 taken along a line A-A of FIG. 7. Referring to FIG. 5 and FIG. 7, the fixed end portion 67 of the second elastic arm 60 formed as the T-shape is embedded in the insulative body 20 at the second side 21B of the terminal groove 21. The transverse base portion 31 is positioned in the terminal groove 21 at the first side 21A of the terminal groove 21 and the two ends of the transverse base portion 31 are fixed to the insulative body 20 via the two fixed portions 33 which are embedded in the insulative body 20, and the transverse base portion 31 is exposed in the terminal groove 21. In this way, the terminal 30 is formed as a double support beam-like contact member by that two ends of the terminal 30 (a distal end of the transverse base portion 31 and a distal end of the second elastic arm 60) are fixed in the insulative body 20, so that the terminal 30 has the advantage of the double support beam-like contact member (because there is no free end, so a card tray or a card adapter inserted into the electronic card connector will not be hooked by the terminal 30 and in turn the terminal 30 will not allow the contact member to be plastically deformed or be damaged). That the transverse base portion 31 is exposed in the terminal groove 21 and the first elastic arm 40 is reversely bent from the transverse base portion 31 allows the terminal 30 to relax the squeeze among materials of the terminal 30 in an extension direction due to strain when the terminal 30 is elastically deformed, and avoids the plastic deformation of the terminal 30 due to excessive squeeze.

Referring to FIG. 8 and FIG. 9, the first elastic arm 40 and the second elastic arm 60 which are respectively positioned at two sides of the contact portion 50 are not higher than the top surface 20A of the insulative body 20. The contact portion 50 protrudes from the top surface 20A of the insulative body 20. In this way, when an electronic card (not shown in Figures) is inserted into an insertion space above the top surface 20A of the insulative body 20, the electronic card will only contact the contact portion 50 of the terminal 30 but will not contact the first elastic arm 40 and the second elastic arm 60 of the terminal 30.

The two ends of the terminal of the electrical connector disclosed in the utility model patent TWM312802 in the background of the present disclosure are fixed in an insulative body and in turn the terminal is formed as a double support beam-like contact member. However, if the double support beam-like contact member is used, the double support beam-like contact member with such a structure is sufficient in rigidity but is not sufficient in the elasticity, the double support beam-like contact member will apply an excessive high contact pressure on an electronic card, which may damage the electronic card or shorten the lifespan of the electronic card. In addition, the first extension portion and the second extension portion of the terminal of the electrical connector in the background extend horizontally and then are directly fixed in the insulative body, that is to say, the two ends of the terminal in the extension direction are inserted in a straight line and fixed. Therefore, when the terminal is deformed downwardly between the two fixed ends, materials of the terminal in the extension direction will squeeze each other due to strain of deformation, which easily allows the terminal to be plastically deformed, the two fixed ends of the terminal will be subjected to excessive squeeze which may allow the two fixed ends of the terminal to be loosed from the insulative body or to be damaged.

The electronic card connector 10 of the present disclosure also uses the double support beam-like contact member, that the transverse base portion 31 is exposed in the terminal groove 21 and the first elastic arm 40 is reversely bent from the transverse base portion 31 allows the terminal 30 to relax the squeeze among materials of the terminal 30 in the extension direction when the terminal 30 is elastically deformed, and avoids plastic deformation of the terminal 30 due to excessive squeeze. In addition, the configuration that the first elastic arm 40 is reversely bent from the transverse base portion 31 can allow the length of the terminal 30 to be increased so as to reduce the rigidity of the terminal 30. Moreover, the configuration that the first elastic arm 40 comprises the two reverse bent elastic portions 41 can allow the contact force applied by the contact portion 50 to be increased. Furthermore, the configuration that the second elastic arm 60 is formed with the upper arm portion 61 and the lower arm portion 65 via the step portion 63 can further increase the contact force applied by the contact portion 50.

Features of some embodiments are summarized in above content, so that a person skilled in the art may better understand various aspects of the disclosed content of the present disclosure. A person skilled in the art of the present disclosure shall understand that the disclosed content of the present disclosure may be easily used to design or modify other manufacturing approach or configuration and in turn to realize the same object and/or attain the same advantage as the embodiments of the present disclosure. A person skilled in the art of the present disclosure shall also understand that, such an equivalent approach or configuration cannot be departed from the spirit and scope of the disclosed content of the present disclosure, and a person skilled in the art may make various changes, substitutions and replacements, which are not departed from the spirit and scope of the disclosed content of the present disclosure.

What is claimed is:

1. An electronic card connector, comprising:
an insulative body provided with a plurality of terminal grooves, each terminal groove comprising a first side and a second side which are opposite, each terminal groove penetrating the insulative body from a top surface of the insulative body to a lower surface of the insulative body; and
a plurality of terminals respectively provided to the plurality of terminal grooves, each terminal comprising:
a transverse base portion positioned at the first side of the terminal groove;
a first elastic arm reversely bent from a side of the transverse base portion toward the first side and extending toward the second side;
a contact portion extending from a distal end of the first elastic arm toward the second side; and
a second elastic arm extending from the contact portion toward the second side;
two ends of the transverse base portion being fixed in the terminal groove at the first side, the transverse base portion being exposed in the terminal groove;
a distal end of the second elastic arm being a fixed end portion fixed at the second side;
the contact portion protruding from the top surface of the insulative body;
the first elastic arm comprising two reverse bent elastic portions and a connecting portion which connects the two reverse bent elastic portions, the two reverse bent elastic portions being spaced apart from each other and being reversely bent from the side of the transverse base portion toward the first side and extending toward the second side.

2. The electronic card connector according to claim 1, wherein the second elastic arm comprises an upper arm portion, a lower arm portion and a step portion, the step portion connects the upper arm portion and the lower arm portion.

3. The electronic card connector according to claim 1, wherein each terminal further comprises a fixed portion connecting the transverse base portion, the fixed portion is embedded in the insulative body.

4. The electronic card connector according to claim 1, wherein each terminal further comprises a soldering portion connecting the transverse base portion, the soldering portion extends downwardly from a side of the transverse base portion toward the second side.

5. The electronic card connector according to claim 1, wherein the fixed end portion is formed as a T-shape and is embedded in the insulative body.

6. The electronic card connector according to claim 1, wherein the first elastic arm and the second elastic arm are not higher than the top surface of the insulative body.

7. The electronic card connector according to claim 1, wherein the insulative body defines a front end and a rear end, the insulative body is provided with two rows of terminal grooves, the two rows extend along a front-rear direction, all the first sides of all the terminal grooves in the front row face toward the front end of the insulative body and all the openings of all the terminal grooves in the front row are positioned at the front end, all the first sides of all the terminal grooves in the rear row face toward the rear end of the insulative body and all the openings of all the terminal grooves in the rear row is positioned at the rear end.

* * * * *